United States Patent [19]

Drent

[11] Patent Number: 5,292,699

[45] Date of Patent: Mar. 8, 1994

[54] POLYMERIZATION PROCESS

[75] Inventor: Eit Drent, Amsterdam, Netherlands

[73] Assignee: Shell Oil Company, Houston, Tex.

[21] Appl. No.: 20,934

[22] Filed: Feb. 22, 1993

Related U.S. Application Data

[62] Division of Ser. No. 837,136, Feb. 19, 1992, Pat. No. 5,279,177

[30] Foreign Application Priority Data

May 31, 1991 [NL] Netherlands .......................... 9100940

[51] Int. Cl.$^5$ .............................................. G01J 31/24
[52] U.S. Cl. .................................... 502/162; 502/168; 502/170
[58] Field of Search ........................ 502/162, 168, 170

[56] References Cited

U.S. PATENT DOCUMENTS

| | | | |
|---|---|---|---|
| 4,849,542 | 7/1989 | Drent | 502/162 X |
| 5,091,507 | 2/1992 | VanLeeuwen | 502/162 X |
| 5,216,119 | 6/1993 | Klusener et al. | 502/162 X |
| 5,229,475 | 7/1993 | Drent | 502/162 X |

*Primary Examiner*—Patrick P. Garvin
*Attorney, Agent, or Firm*—James O. Okorafor

[57] ABSTRACT

An improved process for the production of linear alternating polymers of carbon monoxide and at least one ethylenically unsaturated hydrocarbon comprises contacting the carbon monoxide and hydrocarbon under polymerization conditions in the presence of a reaction diluent and a novel catalyst composition formed from a compound of palladium, the anion of a strong non-hydrohalogenic acid and a bis(diethylphosphino)alkane.

7 Claims, No Drawings

POLYMERIZATION PROCESS

This is a division, of application Ser. No. 837,136, filed Feb. 19, 1992 and now U.S. Pat. No. 5,270,177.

FIELD OF THE INVENTION

This invention relates to an improved process for the production of linear alternating polymers of carbon monoxide and at least one ethylenically unsaturated hydrocarbon. More particularly, the invention relates to such a process employing a novel catalyst composition formed in part from bis(diethylphosphino)alkane.

BACKGROUND OF THE INVENTION

The class of linear alternating polymers of carbon monoxide and at least one ethylenically unsaturated hydrocarbon is now well known in the art. Such polymers are characterized by the repeating formula

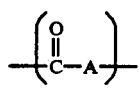

(I)

wherein A is a moiety derived from at least one ethylenically unsaturated hydrocarbon. The processes for the production of such polymers, now known as polyketones or polyketone polymers, is illustrated by van Broeckhoven et al, U.S. Pat. No. 4,843,144 and U.S. Pat. No. 4,880,903. The scope of the polymerization process is extensive, but generally employs a catalyst composition produced from a compound of palladium, cobalt or nickel, the anion of a strong non-hydrohalogenic acid and a bidentate ligand of phosphorus, nitrogen or sulfur. Good results are obtained through the use of catalyst compositions formed from, inter alia, bidentate ligands of phosphorus and such catalyst compositions are generally preferred.

In many polymerization processes for polyketone production the bidentate phosphorus ligand contains aromatic monovalent phosphorus substituents as in the above van Broeckhoven et al patents and particularly preferred bidentate ligands for many polymerization processes are 1,3-bis(diphenylphosphino)propane and 1,3-bis[di(2-methoxyphenyl)phosphino]propane. For the production of certain linear alternating polymers, particularly when the ethylenically unsaturated hydrocarbon monomer is of relatively high molecular weight, e.g., the hydrocarbon monomer has at least 5 carbon atoms, the use of other bidentate phosphorus ligands results in more effective catalyst compositions. For example, in U.S. Pat. No. 5,066,778, the production of linear alternating copolymers of carbon monoxide and cyclopentane is disclosed. For this polymerization, tetraalkylbisphosphines are more suitable and preferred as the bidentate phosphorus ligand and particularly preferred is 1,3-bis(di-n-butylphosphino)propane. It would be of advantage, however, to provide for polyketone polymerization processes which employ more effective catalyst compositions formed in part from a different bis(dialkylphosphino)alkane.

SUMMARY OF THE INVENTION

The present invention relates to an improved process for the production of linear alternating polymers of carbon monoxide and at least one ethylenically unsaturated hydrocarbon and to a novel catalyst composition used in such a process. More particularly, the invention relates to the production of linear alternating copolymers of carbon monoxide and at least one ethylenically unsaturated hydrocarbon, particularly at least one ethylenically unsaturated hydrocarbon of at least 5 carbon atoms, in the presence of a novel catalyst composition formed from a compound of palladium, the anion of a strong non-hydrohalogenic acid and a diethylphosphinoalkane ligand. The production of linear alternating copolymers of carbon monoxide and cyclopentene is of particular interest.

DESCRIPTION OF THE INVENTION

The process of the invention comprises the production of linear alternating polymers of carbon monoxide and at least one ethylenically unsaturated hydrocarbon. The process is particularly applicable to the production of linear alternating copolymers of carbon monoxide and at least one ethylenically unsaturated hydrocarbon of up to 20 carbon atoms inclusive, particularly those hydrocarbons of up to 10 carbon atoms inclusive. Illustrative of the ethylenically unsaturated hydrocarbon monomers of the present process are acyclic hydrocarbons, especially α-olefins, such as ethylene, propylene, isobutylene, hexene, octene and dodecene. Also suitable are aliphatic cycloolefins such as cyclopentene, cyclohexene, 4-methylcyclohexene, norbornene and cyclooctene. The process is especially suitable for the production of linear alternating copolymers of carbon monoxide and an aliphatic ethylenically unsaturated hydrocarbon of at least 5 carbon atoms. Particularly preferred as the hydrocarbon monomer of the process of the invention are such hydrocarbons of from 5 to 10 carbon atoms inclusive, including acyclic olefins such as 1-hexene and 1-octene and cycloolefins such as cyclopentene and cyclohexene. Especially suitable as the hydrocarbon monomer is cyclopentene.

The polymerization process is conducted by contacting the carbon monoxide and hydrocarbon monomer under polymerization conditions in the presence of a liquid reaction diluent and the novel catalyst composition formed from a compound of palladium, the anion of a strong non-hydrohalogenic acid and a bis(diethylphosphino)alkane ligand. The compound of palladium is preferably a palladium carboxylate and palladium acetate, palladium propionate, palladium butyrate and palladium hexanoate are satisfactory. Palladium acetate is particularly preferred.

The anion from which the catalyst composition is formed is the anion of a non-hydrohalogenic acid having a pKa below about 4, preferably below 2. The anion is suitably the anion of an inorganic acid such as sulfuric acid or perchloric acid, or is suitably the anion of an organic acid including carboxylic acids such as trichloroacetic acid, dichloroacetic acid, difluoroacetic acid or trifluoroacetic acid, as well as sulfonic acids such as methanesulfonic acid, trifluoromethanesulfonic acid or p-toluenesulfonic acid. Anions of sulfonic acids are generally preferred, particularly the anion of methanesulfonic acid or p-toluenesulfonic acid. The anion is usefully provided as the free acid but alternatively the anion is provided as a metal salt, particularly as the salt of a non-noble metal of Group VIII, e.g., copper or nickel. However provided, the anion is employed in a quantity from about 1 mol to about 100 mols per mol of palladium, preferably in a quantity of from about 2 mols to about 50 mols per mol of palladium.

The bidentate ligand of phosphorus employed in the formation of the catalyst composition is a bis(diethylphosphino)alkane represented by the formula

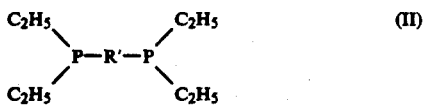

wherein R' is a divalent hydrocarbyl linking group of up to 10 carbon atoms inclusive with from 2 to 4 carbon atoms inclusive in the bridge between the phosphorus atoms. Illustrative of such R groups are 1,2-ethylene, 1,3-propylene, 1,2-propylene, 2,2-dimethyl-1,3-propylene, 1,4-butylene and 2,2,3,3-tetramethyl-1,4-butylene. The preferred R group is 1,3-propylene and the preferred bidentate phosphine ligand is 1,3-bis(diethylphosphino)propane. The phosphorus-containing ligand is employed in a quantity from about 0.5 mol to about 2 mols per mol of palladium. Preferred quantities of phosphorus-containing ligand are from about 0.75 mol to about 1.5 mol per mol of palladium.

It is useful on some occasions to include within the mixture from which the catalyst composition is formed an organic oxidizing agent in order to improve the catalytic activity. Useful organic oxidizing agents include aliphatic nitrites such as butyl nitrite and amyl nitrite and aromatic nitro compounds such as nitrobenzene and dinitrotoluene. The preferred organic oxidizing agents are hydroquinones, both 1,2- and 1,4-hydroquinones. Particularly preferred are 1,4-hydroquinones such as 1,4-benzoquinone and 1,4-naphthoquinone. As stated, the inclusion of organic oxidizing agent is not required but amounts up to about 5000 mols per mol of palladium are satisfactory. When organic oxidizing agent is present, amounts of oxidizing agent from about 10 mols to about 1000 mols per mol of palladium are preferred.

The contacting of the monomeric reactants and the catalyst composition takes place in the presence of a liquid reaction diluent under polymerization conditions. Suitable reaction diluents include alkanols such as methanol and ethanol and alkanones such as acetone and methyl ethyl ketone. Methanol is particularly preferred. Typical polymerization conditions include a reaction temperature from about 20° C. to about 150° C. although reaction temperatures from about 30° C. to about 130° C. are preferred. Useful reaction pressures are from about 2 bar to about 150 bar with preferred pressures being from about 5 bar to about 100 bar.

The contacting takes place in a suitable reactor which is provided with some means of agitation, e.g., stirring or shaking, in order to facilitate reactant/catalyst composition contacting. The molar ratio of carbon monoxide to total ethylenically unsaturated hydrocarbon is from about 10:1 to about 1:10 although molar ratios from about 5:1 to about 1:5 are more often utilized. The quantity of catalyst composition to be used is sufficient to provide from about $1 \times 10^{-7}$ mol to about $1 \times 10^{-3}$ mol of palladium per mol of total olefinic hydrocarbon. Useful quantities of catalyst composition are catalytic quantities. Quantities of catalyst composition sufficient to provide from about $1 \times 10^{-6}$ mol to about $1 \times 10^{-4}$ mol of palladium per mol of total ethylenic hydrocarbon are preferred. Subsequent to polymerization the reaction is typically terminated as by cooling the product mixture and releasing the pressure. The polymer product is obtained as a material substantially insoluble in the reaction diluent and it is recovered by conventional methods such as filtration or centrifugation. The polymer is used as recovered or is purified if desired as by treating the polymer with a solvent or complexing agent which is selective for catalyst residues.

The linear alternating polymer is a thermoplastic material of relatively high melting point and is useful in utilities conventional for thermoplastic polymers as well as an engineering thermoplastic. The polyketones are processed by methods conventional for thermoplastic polymers, e.g., extrusion, thermoforming and injection molding, into a variety of shaped articles of established utility. Specific applications include the production of containers for food and drink and parts and housings for automotive applications.

The process of the application is characterized by the use of novel catalyst compositions formed from, inter alia, a bis(diethylphosphino)alkane ligand. The use of these ligands in catalyst compositions provides better yields of the desired polyketone polymer at faster rates of production than catalyst compositions formed form even closely related tetraalkylbiphosphines. The improved process of the invention provides such better yields of polymer product, particularly during the production of copolymers of carbon monoxide and ethylenically unsaturated hydrocarbons of at least 5 carbon atoms.

The invention is further illustrated by the following Comparative Examples (not of the invention) and the Illustrative Embodiments which should not be regarded as limiting. In each instance where copolymer was produced, the copolymer was examined by $^{13}C$—NMR and found to be linear in character with alternating units derived from carbon monoxide and the ethylenically unsaturated hydrocarbon.

COMPARATIVE EXAMPLE I

A copolymer of carbon monoxide and cyclopentene was produced by charging to an autoclave of 250 ml capacity equipped with a mechanical stirrer 50 ml of tetrahydrofuran and 20 ml of cyclopentene and then a catalyst composition solution containing 2 ml methanol, 0.25 mmol palladium acetate, 0.5 mmol nickel perchlorate, 0.3 mmol 1,3-bis(di-n-butylphosphino)propane and 10 mmol 1,4-naphthoquinone. Carbon monoxide was then added to the autoclave until a pressure of 40 bar had been reached and the autoclave and contents were heated to 40° C. After 16 hours the reaction was terminated by cooling the autoclave and contents and releasing the pressure. The resulting product mixture was stirred with methanol and the copolymer which precipitated was recovered by filtration, washed with methanol and dried. The yield of copolymer was 3.9 g, obtained at a rate of 10 g of copolymer/g Pd hr.

ILLUSTRATIVE EMBODIMENT I

A copolymer of carbon monoxide and cyclopentene was prepared by a procedure substantially similar to that of Comparative Example I except that the catalyst composition contained 0.3 mmol of 1,3-bis(diethylphosphino)propane instead of 1,3-bis(di-n-butylphosphino)propane and the reaction time was 6 hours instead of 16 hours. The yield of copolymer was 13.3 g, obtained at a rate of 90 g of copolymer/g Pd hr.

COMPARATIVE EXAMPLE II

The procedure of Illustrative Embodiment I was repeated except that the catalyst solution contained 0.3 mmol 1,3-bis(dimethylphosphino)propane instead of 1,3-bis(diethylphosphino)propane. No polymer was formed.

COMPARATIVE EXAMPLE III

Into an autoclave of 250 ml capacity equipped with a mechanical stirrer was charged 30 ml of cyclopentene and 30 ml of cyclopentene. In this mixture was dissolved 0.1 mmol palladium acetate, 0.1 mmol p-toluenesulfonic acid, 0.15 mmol 1,3-bis(diphenylphosphino)propane and 40 mmol 1,4-benzoquinone. Carbon monoxide was pressurized into the autoclave and contents were warmed to 70° C. After 5 hours, the mixture was cooled and the pressure released. No polymer was obtained.

COMPARATIVE EXAMPLE IV

A copolymer of carbon monoxide and 1-octene was obtained by charging to an autoclave of 250 ml capacity equipped with a mechanical stirrer 100 ml of tetrahydrofuran and 40 ml of 1-octene and then a catalyst composition solution comprising 5 ml methanol, 0.1 mmol palladium acetate, 0.5 mmol nickel perchlorate, 0.12 mmol 1,3-bis(di-n-butylphosphino)propane and 5 mmol of 1,4-naphthoquinone. After adding carbon monoxide until a pressure of 40 bar was reached the autoclave and contents were heated to 40° C. After 15 hours the reaction was terminated by cooling the reactor and contents and releasing the pressure. The resulting mixture was stirred with acetone and the copolymer which precipitated was recovered by filtration, washed with acetone and dried. The yield of copolymer was 25 g, obtained at a rate of 167 g of copolymer/g Pd hr.

ILLUSTRATIVE EMBODIMENT II

A copolymer of carbon monoxide and cyclopentene was produced by a procedure substantially similar to that of Comparative Example IV except that the catalyst solution contained 0.12 mmol 1,3-bis(diethylphosphino)propane instead of 1,3-bis(di-n-butylphosphino)propane and the reaction was 6 hours instead of 15 hours. The yield of copolymer was 37.5 g, obtained at a rate of 625 g of copolymer/g Pd hr.

COMPARATIVE EXAMPLE V

A copolymer of carbon monoxide and ethylene was produced by charging to an autoclave of 250 ml capacity equipped with a mechanical stirrer a catalyst composition solution consisting of 50 ml methanol, 0.25 mmol palladium acetate, 0.5 mmol trifluoroacetic acid, and 0.3 mmol 1,3-bis(di-n-butylphosphino)propane. Ethylene was added to give a pressure of 20 bar and then carbon monoxide was introduced until a total pressure of 50 bar was reached. After the autoclave contents were maintained for 10 hours at room temperature, reaction was terminated by releasing the pressure. The resulting copolymer was recovered by filtration, washed and dried. The yield of copolymer was 6.25 g, obtained at a rate of 25 g of copolymer/g Pd hr.

ILLUSTRATIVE EMBODIMENT III

A copolymer of carbon monoxide and ethylene was produced by a procedure substantially similar to that of Comparative Example V except that the catalyst composition solution contained 0.3 mmol 1,3-bis(diethylphosphino)propane instead of 1,3-bis(di-n-butylphosphino)propane and the reaction time was 3 hours instead of 10 hours. The yield of copolymer was 15 g, obtained at a rate of 200 g of copolymer/g Pd hr.

ILLUSTRATIVE EMBODIMENT IV

A copolymer of carbon monoxide and norbornene was prepared by charging to an autoclave of 250 ml capacity equipped with a mechanical stirrer a catalyst composition solution containing 15 ml methanol, 45 ml tetrahydrofuran, 0.25 mmol palladium acetate, 0.5 mmol nickel perchlorate, 0.3 mmol 1,3-bis(diethylphosphino)propane and 5 mmol 1,4-naphthoquinone. To the autoclave was added 20 ml of norbornene and then carbon monoxide was added until a pressure of 40 bar was reached. The autoclave and contents were then heated to 60° C. After 10 hours the reaction was terminated and the resulting polymer product was recovered by filtration, washed with methanol and then dried. The yield of copolymer was 13 g, obtained at a rate of 52 g of copolymer/g Pd hr.

What is claimed is:

1. A catalyst composition formed by reacting a compound of palladium, with an anion of a non-hydrohalogenic acid having a pKa below 2 and a bis(diethylphosphino)alkane.

2. The composition of claim 1 wherein the bis(diethylphosphino)alkane is represented by the formula

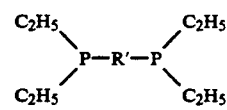

wherein R is a divalent hydrocarbyl linking group of up to 10 carbon atoms inclusive with from 2 to 4 carbon atoms in the bridge.

3. The composition of claim 2 wherein the palladium compound is palladium acetate.

4. The composition of claim 3 wherein the anion is the anion of a sulfonic acid.

5. The composition of claim 4 wherein the quantity of anion is from about 1 mol to about 100 mols per mol of palladium.

6. The composition of claim 7 wherein $R^1$ is 1,3-propylene.

7. The composition of claim 6 wherein the quantity of bis(diethylphosphino)alkane is from about 0.5 mole to about 2 moles per mol of palladium.

* * * * *